United States Patent

Moll

(10) Patent No.: US 8,938,375 B2
(45) Date of Patent: Jan. 20, 2015

(54) OPTIMIZING BUSINESS PROCESS MANAGEMENT MODELS

(75) Inventor: Georges-Henri Moll, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 635 days.

(21) Appl. No.: 13/270,799

(22) Filed: Oct. 11, 2011

(65) Prior Publication Data

US 2012/0095734 A1    Apr. 19, 2012

(30) Foreign Application Priority Data

Oct. 15, 2010    (EP) .................................... 10306122

(51) Int. Cl.
| | | |
|---|---|---|
| G06F 7/60 | (2006.01) | |
| G06F 17/10 | (2006.01) | |
| G06Q 10/06 | (2012.01) | |
| G06F 17/11 | (2006.01) | |
| G06Q 10/04 | (2012.01) | |

(52) U.S. Cl.
CPC ................ *G06Q 10/06* (2013.01); *G06Q 10/04* (2013.01); *G06F 17/11* (2013.01)
USPC .................................. 703/2; 703/6; 705/7.11

(58) Field of Classification Search
CPC ....... G06Q 10/06; G06Q 10/04; G05B 13/04; G06F 17/10–17/11
USPC ............................................................. 703/2
See application file for complete search history.

(56) References Cited

U.S. PATENT DOCUMENTS

| | | | | |
|---|---|---|---|---|
| 6,934,931 | B2* | 8/2005 | Plumer et al. ................. | 717/104 |
| 7,363,126 | B1* | 4/2008 | Zhong et al. .................... | 701/25 |
| 7,653,522 | B2* | 1/2010 | Peralta et al. ...................... | 703/6 |
| 8,000,988 | B1* | 8/2011 | Bezanson et al. ............ | 705/7.11 |
| 8,160,917 | B1* | 4/2012 | Solanki et al. ............... | 705/7.31 |
| 8,457,996 | B2* | 6/2013 | Winkler et al. ............... | 705/7.11 |
| 8,477,423 | B2* | 7/2013 | Kaneiwa et al. ......... | 359/489.06 |

(Continued)

FOREIGN PATENT DOCUMENTS

CN          101751618  A       6/2010

OTHER PUBLICATIONS

Truong et al, "Optimal Design Methodologies for Configuration of Supply Chains", International Journal of Production Research, vol. 43, No. 11, Jun. 2005.*

(Continued)

*Primary Examiner* — Mary C Jacob
(74) *Attorney, Agent, or Firm* — Moore & Van Allen PLLC

(57) ABSTRACT

A method of optimizing a Business Process Management (BPM) model, where the model is associated with a plurality of key performance indicators depending on a control parameter vector that includes a plurality of control parameters, may include separating the plurality of control parameters into a linear control parameter vector and a non-linear control parameter vector. A set of candidate values may be iteratively calculated for the control parameter vector. Each candidate value may be determined for a preselected value of a non-linear control parameter belonging to the non-linear control parameter vector from execution of a mixed integer program model associated with the BPM model, the key performance indicators and the preselected value of the non-linear control parameter vector. The method may further include adjusting the BPM model based on at least one of the candidate values.

15 Claims, 4 Drawing Sheets

(56) References Cited

U.S. PATENT DOCUMENTS

| | | | |
|---|---|---|---|
| 8,494,976 B2* | 7/2013 | Furman et al. | 705/400 |
| 8,670,960 B2* | 3/2014 | Couet et al. | 703/2 |
| 2005/0038764 A1 | 2/2005 | Minsky | |
| 2009/0228309 A1* | 9/2009 | Moll | 705/7 |
| 2013/0018700 A1* | 1/2013 | Ervolina et al. | 705/7.31 |

OTHER PUBLICATIONS

Bachelet et al, "Model Enhancement: Improving Theoretical Optimization with Simulation", Simulation Modelling Practice and Theory, 15, pp. 703-715, 2007.*

Bataineh et al, "Development and Application of a Metaheuristic Optimization Procedure Integrated with Simulation for a Bus Transit System", IEEE, 2008.*

Deroussi et al, "Combining Optimization Methods and Discrete Event Simulation: A Case Study in Flexible Manufacturing Systems", IEEE, 2006.*

Ghodsypour et al, "The Total Cost of Logistics in Supplier Selection, Under Conditions of Multiple Sourcing, Multiple Criteria and Capacity Constraint", Int. J. Production Economics, 73, 2001.*

Wen et al, "A Simple Tabu Search Method to Solve the Mixed-Integer Linear Bilevel Programming Problem", European Journal of Operational Research, 88, 1996.*

Yang et al, "Tabu-Search Simulation Optimization Approach for Flow-Shop Scheduling with Multiple Processors—A Case Study", Int. J. Production Research, vol. 42, No. 19, Oct. 2004.*

Chunxu, Wu, et al., Optimization Methods and Models Supplier Selection for N-Product under Uncertainty: A Simulation-Based Optimization Method, Proceedings of ICM '2007, The 6th International Conference on Management, Aug. 3-5, 2007, Wuhan, China, pp. 46-50.

Tao Yaxiong et al., "A Research on BPM System based on Process Knowledge," Cybernetics and Intelligent Systems, 2008 IEEE Conference, Sep. 2008, pp. 1-7.

Lu Wan et al., "Research and Application of Business Process Management Based SOA and BPEL," China Academic Journal Electronic Publishing House, 2009, 4 pages.

* cited by examiner

OPTIMIZING BUSINESS PROCESS MANAGEMENT MODELS

CROSS-REFERENCE TO RELATED APPLICATION

The present application claims benefit of priority to European Application No. EP10306122.2 filed on Oct. 15, 2010, the contents of which are hereby incorporated by reference herein in its entirety.

FIELD OF THE INVENTION

The present invention generally relates to Business Process Management systems (BPM) and in particular to a method and system for optimizing BPM models.

BACKGROUND OF THE INVENTION

Business Process Management systems are used to organize and manage large amounts of information.

Business process management (BPM) is focused on aligning organizations with the needs of clients. With advanced workflow technology, BPM performs an omni-directional management on enterprises from the aspect of business process, and supports enduring improvements of business process. It provides a unified modeling, executing, and monitoring environment for various businesses within an enterprise and among enterprises. BPM technology allows reduction of the mismatch between business requirements and IT systems, improvement of productivity and reduction of operating and development costs.

A business process is a collection of related, structured activities that produce a service or product that meet certain requirements. Business processes are critical to a business organization as they generate revenue and often represent a significant proportion of costs.

Business Process Management encompasses a set of methods, techniques, and tools for modeling, developing, executing, and managing business processes of an organization. BPM allows business analysts create a business process model, which is then refined by IT engineers to an executable model. The executable process model is deployed to a process engine, which executes the process by delegating tasks to resources (humans and services).

Business process performance in BPM systems is measured based on key performance indicators (KPIs). Key Performance Indicators (KPIs) are generally defined by BPM designers.

BPM designers focus on optimizing BPM models with regard to KPIs, by tuning a certain number of control parameters.

Business Process Management systems rely on an initial modeling phase where a business analyst function is determined to describe the steps, rules, and KPIs for the business process, and estimate expected performance via discrete event simulation.

Current solutions for enhancing performance of BPM systems provide information on KPI achievement. However, when KPIs need to be optimized, it is generally required to determine which control parameters need later adjustment by business analysts. However, KPIs often depend on several metrics so that it is difficult to identify the causes of sub-optimality.

Similarly, BPM (Business Process Management) modelers involved in the initial modeling phase may need to see the impact of changing some values of control parameters. Currently, those parameter changes are performed manually and the effect of these changes is experimented by launching a discrete event simulation model returning the desired KPIs.

However, this process can be very long and requires BPM experts' inputs. Some existing BPM tools are provided with a local search mechanism that speeds up tuning the control parameter vector. However, the local search engine has no knowledge about the structure of the BPM network: to tune the control parameters, this local search solution simply gets key performance indicators results from simulation, but ignores the structure of the problem, which makes it quite slow.

Accordingly, there is a need for an improved method and system for determining optimal control parameters values with regard to KPIs.

SUMMARY OF THE INVENTION

The invention allows automatic solving of complex BPM parametric optimization problems that appear in the BPM design process, without requiring manual test, try steps.

According to the invention, Mixed Integer Programming (MIP) is used as the optimization engine and discrete-event simulation is used as the simulation engine, allowing optimization and simulation to operate at the same level. Simulation is used to validate and refine the MIP approximation of the BPM system, and the control parameters of the BPM problem are used as a communication vector.

It is another advantage of the invention to separate the data that can be modeled by Mixed Integer Programming from the data that cannot be modeled by Mixed Integer Programming, and iteratively use this distinction as a "partial" hint for an automated local search. Still another advantage of the invention is to reduce the communication between both sides to control parameters only.

The invention results in a synergy between MIP and simulation that allows to benefit both from the quality of the MIP results and from the precision given by the local search refining upon simulation.

In accordance with an aspect of the invention, a method of optimizing a Business Process Management (BPM) model, where the model is associated with a plurality of key performance indicators (KPI) depending on a control parameter vector that includes a plurality of control parameters, may include separating, by a processor, the control parameters into a linear control parameter vector (X) and a non-linear control parameter vector (X'). The method may also include iteratively calculating, by the processor, a set of candidate values for the control parameter vector. Each candidate value may be determined for a preselected value of a non-linear control parameter belonging to the non-linear control parameter vector (X') from execution of a mixed integer program (MIP) model associated with the BPM model, the plurality of key performance indicators (KPI) and the preselected value of the non-linear control parameter vector (X'). The method may further include adjusting, by the processor, the BPM model based on at least one of said candidate values for the control parameter vector.

In accordance with another aspect of the invention, a method for optimizing a BPM model may include separating, by a processor, a plurality of control parameters for the BPM model into a group of linear control parameters and a group of non-linear control parameters. The method may also include determining, by the processor, a value for each non-linear control parameter. The method may additionally include determining, by the processor, an approximation of a set of optimal control parameters, an approximation of a set of key performance indicator (KPI) values and approximation of a set of BPM output values based at least on the value of each non-linear control parameter, the group of linear control parameters, the BPM model and a KPI vector. The method may further include determining, by the processor, target KPI values and target BPM output values and refining, by the processor, the approximation of the optimal control parameters based at least on the target KPI values and target BPM output values.

In accordance with another aspect of the invention, a system for optimizing a BPM model may include a processor and a process model generation tool operating on the processor to generate a process model. The system may also include a BPM model optimization unit to optimize a BPM process by determining a set of optimal control parameters for a set of key performance indicators using a predetermined optimization process and a discrete-event simulation. The system may further include an execution engine to execute the process model using the optimal control parameters from the BPM model optimization unit to satisfy the key performance indicators.

In accordance with a further aspect of the invention, a computer program product for optimizing a Business Process Management (BPM) model may include a computer readable storage medium having computer readable program code embodied therewith. The computer readable program code may include computer readable program code configured to separate a plurality of control parameters of a control parameter vector into a linear control parameter vector and a non-linear control parameter vector. The computer readable program code may also include computer readable program code configured to iteratively calculate a set of candidate values for the control parameter vector. Each candidate value may be determined for a preselected value of a non-linear control parameter belonging to the non-linear control parameter vector from execution of a mixed integer program (MIP) model associated with the BPM model, a plurality of key performance indicators (KPI) and a preselected value of the non-linear control parameter vector. The computer readable program code may further include computer readable program code configured to adjust the BPM model based on at least one of the candidate values for the control parameter vector.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

The drawings are intended to depict only typical embodiments of the invention, and therefore should not be considered as limiting the scope of the invention.

DETAILED DESCRIPTION

Figure 1:
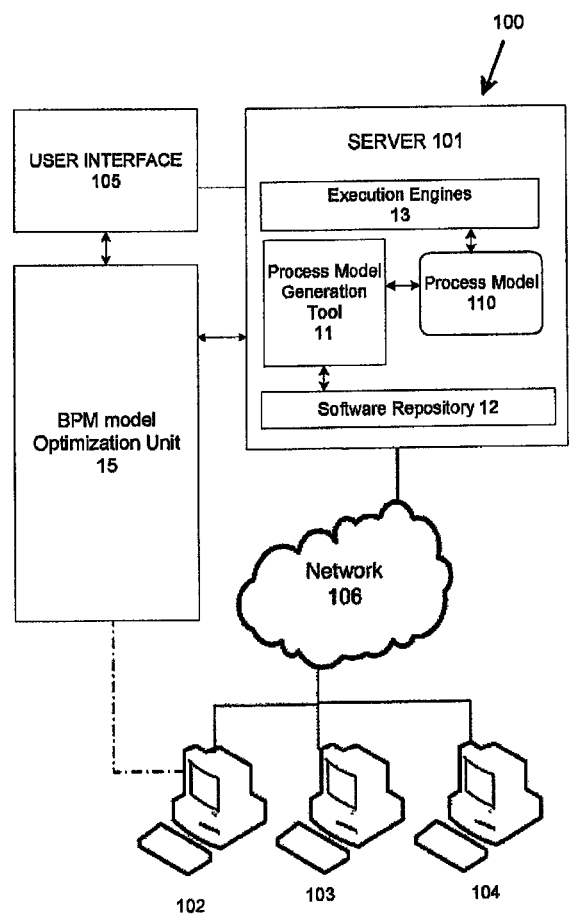
FIG. 1 shows a block diagram illustrating an exemplary hardware architecture in which the present invention may be used.

FIG. 1 schematically illustrates an exemplary hardware architecture 100 of a Business Process Management system (BPM) in which the present invention can be implemented.

The BPM architecture 100 includes a server 101 interacting with a set of client computers 102, 103, 104 over a network 106, such as a wide area network (WAN), such as the global Internet, a private WAN, a local area network (LAN), a telecommunications network or any combination of the above-mentioned networks. The server 101 may be used by a user to manage business processes.

Server 101 may include Business Process Management (BPM) software engines that deliver data and/or user functionality to client computers 102, 103, 104. It should be noted that although FIG. 1 shows only one server 101 and three client computers 102, 103, 104, the system of the present invention supports any number of servers and client computers connected via network 106.

In various embodiments, the BPM system includes at least one graphical user interface (GUI) 105 accessible via the network for allowing a user to view the performance of business processes.

The architecture 100 further comprises a BPM optimization unit 15 to optimize BPM performance criteria represented by Key Performance Indicators.

The BPM optimization unit 15 may comprise computer source code, scripting language code or interpreted language code that is compiled to produce computer instructions that perform various functions of the present invention.

Even if the BPM optimization unit 15 is shown as being separated from the other components of architecture 100, the skilled person will readily understand that it may alternatively reside on the server 101 or in a distributed fashion on server 101 and on client computers 102, 103, 104. In one embodiment of the present invention, the BPM optimization unit 15 is a client-server application having a client portion that resides on the computer of client computers 102, 103, 104 and a server portion that resides on server 101.

The BPM server 101 comprises a process model generation tool 11 that can be used by business analysts to generate a process model 110 (also referred to thereinafter as a BPM model or a business process model) describing the steps, the set of rules, and the Key performance indicators (KPIs) for the business process. The business process model may be defined using any suitable language such as BPMN (Business Process Modeling Notation) or XPDL (XML Process Definition Language). During the BPM modeling phase, the Key Performance Indicators (KPIs) and their target values are defined based on a number of control parameters such as business goals, process performance metrics, and technical parameters such as the Quality of Service (QoS) metrics.

The process model thus generated describes the sequence of steps in the business process. The model specifies the software system or human role that is responsible for performing each step and the rules governing the step execution. The process model can further specify the cost and available quantity of each resource required in the process steps, the expected processing duration of each step, and the branching ratios at various forks in the processing path.

In a second phase, the BPM server assembles the process model to implement it using a set of software components retrieved from a software repository 12. The process assembly may be generated automatically from the process model.

The BPM server 101 further comprises a set of execution engines 13 for deploying the process model as assembled. The execution engines 13 are provided to automate the execution of the process model. The execution engines 13 route each instance of work according to the steps defined in the process model as assembled. The execution engines 13 further automate and manage the BPM defined in the business process as modeled while ensuring that the processing conforms to predefined rules.

The BPM optimization unit 15 is adapted to optimize the BPM process (also referred to thereinafter as BPM model or BPM process model or process model) by calculating optimal control parameters for the KPIs using not only optimization techniques but also discrete-event simulation.

Figure 2:
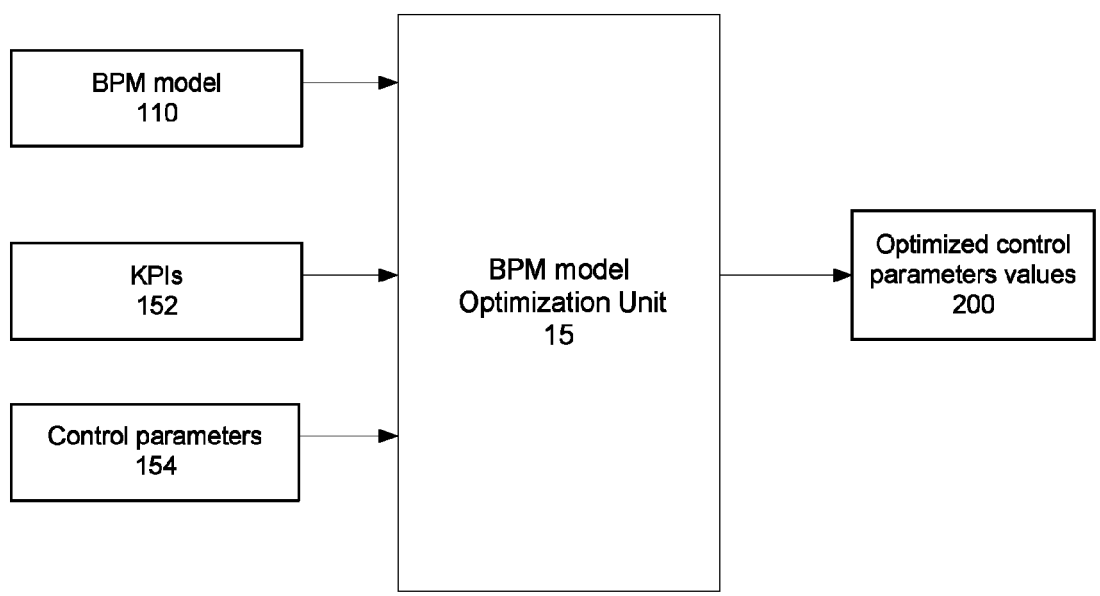
FIG. 2 shows a high-level view of the BPM optimization unit according to certain embodiments of the invention.

FIG. 2 is a high-level view of the BPM optimization unit 15. To calculate optimized control parameters in case of a deviation from the simulated KPI or upstream the process execution phase, the BPM optimization unit 15 uses the process model 110 (as assembled) describing the business process, a predefined linear combination of KPI parameters or KPI vector 152 constituting the objectives that are to be optimized, and a set of control parameters 154 forming a control parameter vector. The control parameter vector and the KPI set are chosen from parameters predefined by the user as part of the BPM model. Among the predefined control parameters and KPIs, some are implemented in the MIP model (and hence will be treated by the MIP optimization engine) while all others will be treated by the local search algorithm together with the simulation engine.

The BPM optimization unit 15 is adapted to determine the optimal control parameter vector 200 that provides the best performance with respect to the KPI parameters 152 from the process model 110, the KPI vector 152 and the control parameter vector 154.

The optimized control parameter vector 200 as determined will be provided to the execution engines 13 to execute or re-execute the process model, so that the KPI parameters are satisfied.

Figure 3:
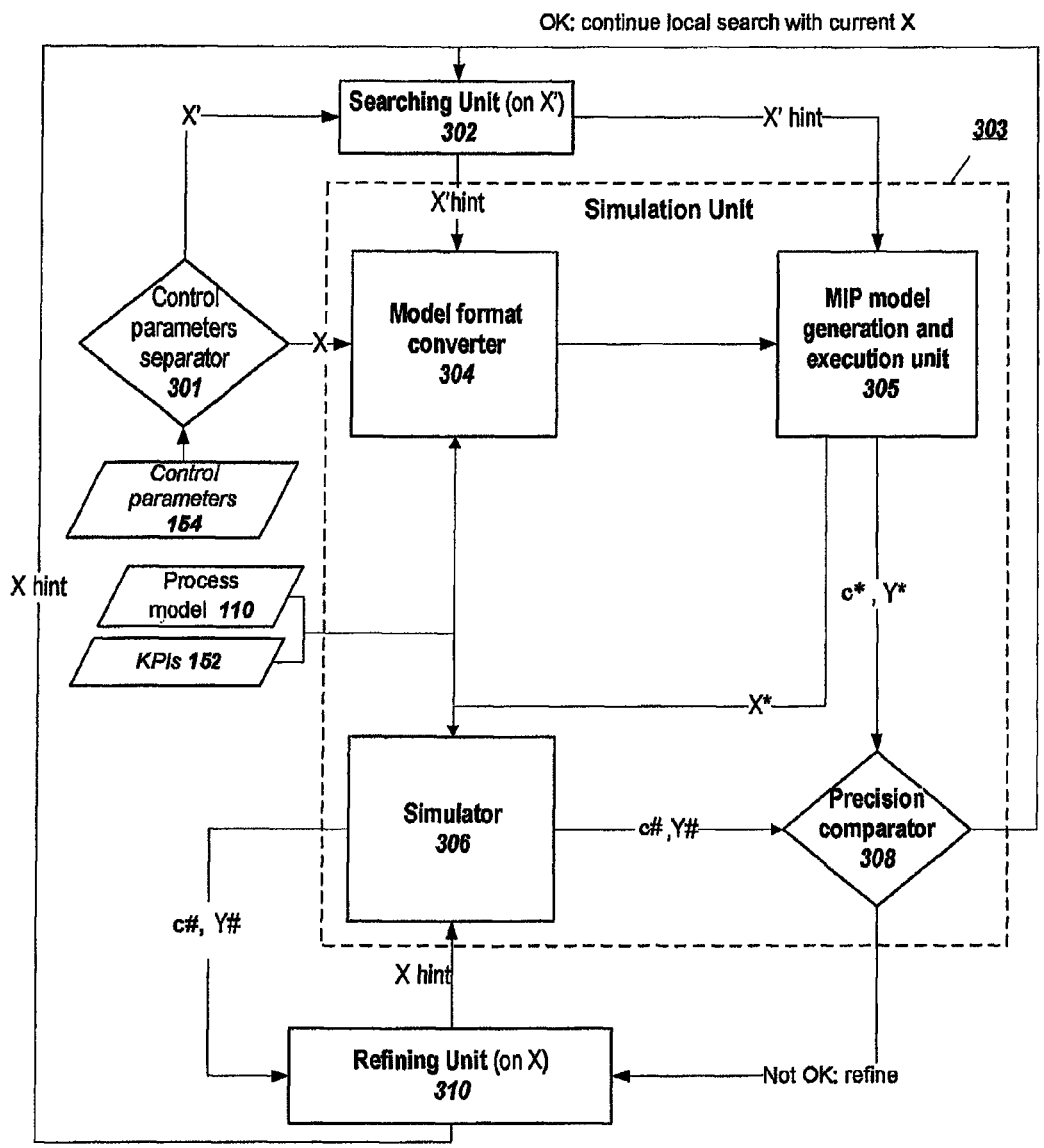
FIG. 3 shows a detailed view of the BPM optimization unit according to embodiments of the invention.

FIG. 3 schematically shows the structure of the BPM optimization unit 15 in accordance with various embodiments of the invention.

The BPM optimization unit 15 comprises a control parameter separator 301 for separating the control parameter vector 154 comprising a set of control parameters that are to be optimized into a linear control parameter vector X and a non-linear control parameter vector X'. The control parameter vector 154 will be designated thereinafter as vector (X, X').

The non-linear control parameter vector X' provided by the control parameter separator 301 are transmitted to a searching unit 302 that performs a local search for the non-linear parameters and iteratively provides hints for non-linear control parameters X'.

According to certain embodiments of the invention, the linear control parameters X will be captured as constant in a Mixed Integer Programming (MIP) model, while the non-linear parameter X' will be excluded from the MIP model and instead will be optimized using a local search mechanism. The non-linear control parameter hints provided by the local search for non-linear control parameter X' will be used as constants in the MIP model.

Mixed Integer Programming refers to a technique used for solving a variety of practical optimization problems. Generally, a mixed integer program ("MIP") is an optimization problem presented in the following form:

minimize f(x)

Subject to G(x)=b l<=x<=u some or all xj integral, where x is a vector of variables, l and u are vectors of bounds, f(x) is an objective expression, and G(x)=b is a set of constraint expressions.

While the above model has a minimization objective, one of skill will recognize that models may have maximization objectives.

The simplest and most widely used form of MIP model is the Mixed Integer Linear Program (MILP) in the following form:

minimize c<T>x subject to Ax=b l<=x<=u some or all xj integral, where A is an m by n matrix, called the constraint matrix, and c is the linear objective vector. A MILP is a linear program ("LP") with an integrality restriction on some or all of the variables.

Mathematical models in the form of mixed integer programs can be used to represent business process management problems. The data models are indexed by resources, resource category, process steps, and time buckets. In particular, MIP programming methods can be used to determine resource assignments in BPM models and simulating business processes to generate resource assignment recommendations, and apply the resource assignment recommendations to future execution to provide an optimal environment.

The invention allows coupling simulation with MIP using a local search to provide one value for all control parameter vector X'. The searching unit 302 may apply any suitable local search mechanism (e.g. hill climbing, taboo or simulated annealing approaches) to iteratively determine hints for the non-linear control parameter vector X'. In accordance with the embodiments of the invention, the hints provided by the searching unit then become constants for the MIP model and can be solved by branch and bound/branch and cut, etc.

The linear control parameter vector X is provided to a discrete event simulation unit 303 together with the hints values for the non-linear parameters calculated by the searching unit 302.

The simulation unit 303 comprises a model format converter 304 provided to convert the process model 110 received in a first format into a second format. The converter 304 is such that it filters some data of the process model 110 as received to ensure that only the required information for the MIP model generation and execution are maintained in the process model in the second format. In one embodiment of the invention, the first format of the process model 110 is a BPMN format and the second format is of the type Entity/Relationship format.

According to this embodiment of the invention, the process model 110 is converted by converter 304 in the form of one or more Entity-Relationship tables.

The process model 110 as converted by the converter 304 is provided to a MIP model generation and execution unit 305 (also referred to thereinafter as "MIP model unit").

The MIP model unit 305 creates and executes a MIP model based on the hints values determined for the non-linear control parameter vector X', the process model 110 as converted by converter 304, and the KPI parameters 152.

The MIP model unit 305 may generate a MIP model according to any suitable solution, such as the solution described in U.S. 2009/0228309, by capturing a substantial subpart of the BPM parametric tuning problem. Such solution optimizes a substantial subpart of the overall optimization problem, yet actually accounting for only a (MIP tractable) subset of control parameters, a (MIP tractable) subset of KPIs, and a (MIP tractable) approximate model of the BPM model. It allows for example solving any resource sizing problem as well as any some resource allocation problem. It allows finding the maximum throughput at minimal cost, at fixed resources, or finding the cheapest resource usage for a target throughput. Other examples include with no limitation finding the best configuration for minimizing the cost per item.

The MIP model unit 305 runs the MIP model thus generated and calculates an approximation $X^*$ of the optimal linear control parameters X for the MIP model. It further provides an approximation $c^*$ of KPI parameters and an approximation $Y^*$ of BPM output values. The BPM output values represent any statistical outcome from the BPM model, which are neither control parameter nor KPI, but still are of some interest for the BPM model designer. An example of a BPM output value could be the idle time for each resource, or the average idle time over all resources.

The resulting approximation $X^*$ for the linear control parameter vector for X is then tested by a discrete event simulation module 306. The simulator 306 determines precise KPI parameter values "c#" (also referred to as "target values" for the KPI) as well as precise BPM output values "Y#" (also referred to as "target values" for the BPM outputs) from the approximation $X^*$ of the optimal linear control parameter calculated by the MIP model executing unit 305. The term "precise" is used here to designate values calculated by a mathematical model capturing almost completely the complexity of the BPM model.

The approximation of KPI parameters obtained by the performance simulator 306 is then used by a precision comparator 308 for evaluating the precision of the simulation. The precision comparator 308 compares the MIP solution provided by the MIP model executing unit 305 ($c^*,Y^*$) with the output (c#,Y#) of the performance simulator 306.

If the precision comparator 308 determines that the precision of the MIP solution ($c^*,Y^*$) with respect to the precise values (c#,Y#) is not satisfying (an absolute or relation distance upper bound is provided by the user), the approximation of control parameters $X^*$ is transmitted to a refining unit 310 which refines the approximation $X^*$ of the optimal control parameters, by using a local search mechanism. The refining phase is terminated when stopping conditions are satisfied (such as conditions related to the precision or time number of iterations).

If the precision comparator 308 determines that the precision of the MIP solution ($c^*,Y^*$) with respect to the values (c#, Y#) is satisfying, the process is repeated for neighbor values of the non-linear control parameters X' (provided by the searching unit 302) until a stopping condition is detected.

The invention thereby dramatically speeds up the local search process by modeling a part of the process model infrastructure in a Mixed Integer Programming model for a set of the control parameters and for suitable KPIs (the subset of MIP-tractable KPIs), and using MIP problem solving algorithms (e.g. simplex, branch and cut, branch and bound) to solve that sub-problem. The BPM optimization solution in according with the embodiments of the invention provides a coupling mechanism between simulation and MIP model in order to provide optimized control parameters with regard to the KPIs.

The BPM optimization unit 15 automatically optimizes the control parameters associated with the KPI parameters by generating a MIP model capturing a substantial subpart of the BPM parametric tuning problem, represented by the linear control parameter X. However, for the minor part of the BPM parametric tuning problem—represented by the non-linear parameters X'—that is too complex or not adapted to be modeled in mixed integer programming model, a local search mechanism is used. The BPM optimization unit 15 then combine the two parts to provide an optimized control parameter vector 200.

The performance of the BPM design may thus be optimized by coupling MIP problem optimization with discrete event simulation used as evaluation function of local search, that both cannot efficiently completely capture. The cooperation of both sides is achieved by exchanging only selected control parameter values.

Even if the invention is not limited to any control parameter vector and KPI vector, the invention has certain advantages when the control parameters and the KPIs have a significant subset being among the predefined MIP ones.

Figure 4:
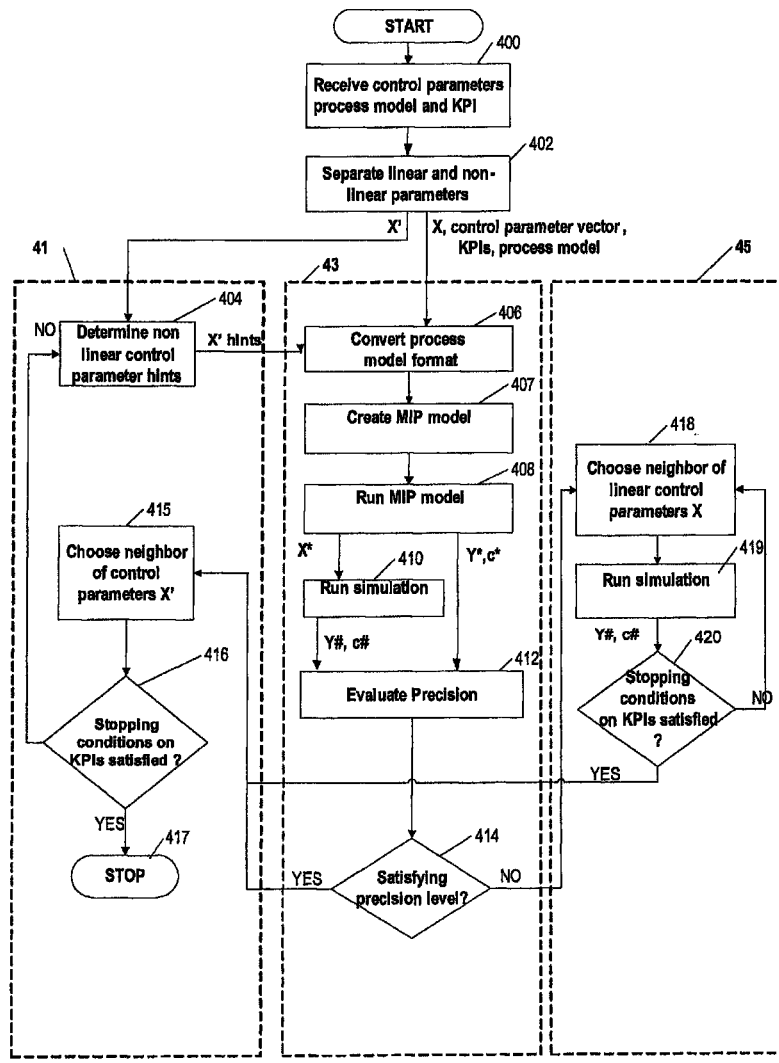
FIG. 4 shows the flowchart that describes the BPM optimization steps according to certain embodiments of the invention.

FIG. 4 is a flowchart for calculating optimal control parameters related to KPIs, in accordance with certain embodiments of the invention.

In step 400, the control parameter vector associated with the process model is received and in step 402 the control parameter vector is separated into linear parameters X and non-linear parameters X'.

The method of optimizing the KPI control parameters may be formulated as:

$$(X, X')/\max c/(c,Y)=f(X, X')$$

under constraints $A(X') \cdot X < B(X')$ where:
  f represents the evaluation function comprising a discrete event simulation; a- X represents linear control parameters (or variables),
  X' represents the non-linear control parameters,
  Y represents the BPM output variables
  c represents the KPI objective vector; in the preferred embodiments of the invention, it comprises an ordered finite set of KPIs which allows to decide if a solution is satisfying (e.g. better, equal or worse than another), and
  A and B are the linear (MIP) matrix and vector, function of X', representing known MIP constraints on X The evaluation function f will be used by a local search method to evaluate the solution provided by control parameters. According to the embodiments of the present invention, the evaluation function is implemented by simulating the BPM model and observing the KPIs outcome.

The non-linear control parameters X' will be processed by a local search mechanism (represented by block 41) to determine hints for the non-linear control parameters vector X' which will be used by an optimization/ simulation branch 43.

More specifically, in step 404 of the local search branch 41, any suitable local search mechanism (such as hill climbing, taboo or simulated annealing) is iteratively applied to provide one or more values for the non-linear control parameters X', such as for example a first hint X'0. The selected values for non-linear control parameters X' will become constants for the MIP model so that they can be solved (e.g. by branch and bound/branch and cut).

In step 406, the process model is converted from the first format (e.g. BPMN format) into the second format (e.g. Entity-Relationship format).

In step 407, the MIP model is generated based on the first hint X'0, the linear control parameters X, the business process model 110 and the KPI vector 152.

In step 408, the MIP model is executed to determine an approximation of optimal control parameter X*, an approximation of KPI vector c*, and an approximation of business process outputs Y*. The MIP approximations are determined according to the following problem formulation:

$$\max c = G(X') \cdot (X, Y)$$

$$L(X') \cdot (X, Y) < E(X')$$

$$A(X')X < B(X')$$

where G is the linear approximation of f, and L and E represent the linear (MIP) matrix and vectors, function of X', representing the BPM system, with additional internal variables vector Y (linear approximation of the link between input and output variables).

In step 410, the resulting approximation X* determined for X is tested by simulation f(X*,X').

In this phase, X* is used as the hint for linear control parameter X in the resolution of the optimization problem and the simulation provides a KPI value c# (referred to thereinafter as "precise KPI value") and BPM output values Y# (referred to thereinafter as "precise BPM output values").

In step 412, the precision of the simulation is calculated by comparing approximation values for KPI and BPM system variables (x*,Y*) with their precise values (c#, Y#)=f(X, X'). In this step a precision indicator PR may be determined based on (c#, Y#) and (c*, Y*), and then compared to a threshold value (P-Tolerance). This precision condition expresses that the simulated outcome is not expected to be exactly equal to the MIP optimized outcome. An approximate equality, up to some user-defined percentage, or up to some user-defined maximum absolute slack may be satisfying. The performance indicator PR is in particular determined as being equal to:

$$PR = |(c\#, Y\#) - (c^*, Y^*)| / |(c\#, Y\#)|$$

If the precision is satisfying (PR>P-tolerance), the local search mechanism (branch 41) is repeated to provide a next value for the non-linear parameter X' if stopping conditions are not satisfied.

The local search mechanism of branch 41 provides new hints for the non-linear parameter vector X'. In step 415, the neighborhood of vector X' is calculated. In step 416, it is then determined if predefined stopping conditions are satisfied, such as conditions related to the precision, conditions related to the number of local search iterations (tracked with a counter) or conditions related to KPIs. If the stopping conditions are satisfied, the loop is terminated in step 417. If the stopping conditions are not satisfied, step 404 selects the neighbor value X'next of X' as the next value for X' and uses this value as a constant to determine the MIP model. Steps 406 to 414 are repeated with the new value X'next.

The different approximations X* found for each hint X' are then compared so as to only keep the best solution.

If it is determined that the precision is not satisfying (PR<P-tolerance) in step 414, the approximation X* of the control parameters is itself refined by the refining branch 45 which uses a local search mechanism. The local search mechanism of the refining branch 45 may be the same as the one used in the local search branch 41 or another one.

The refining branch 45 applies a local search mechanism to refine the approximation X* of the linear control parameter.

In step 418, the neighborhood of vector X* is calculated and the neighbor value Xnext of X* is selected as the next value for X*. In step 419, the neighbor value Xnext of X* is used to recalculate the simulation values (c#, Y#)=f(X, X'). In step 420, it is determined if predefined stopping conditions are satisfied, such as conditions related to the precision, conditions related to the number of local search iterations (tracked with a counter) or conditions related to KPIs (e.g. detection of incrementation on KPIs). If the stopping conditions are satisfied, a new hint is determined by iterating steps 415 and 416 of the local search branch 41. If the stopping conditions are not satisfied, step 418 and 419 are repeated.

The stopping conditions used in steps 416 and 420 in relation with the respective local search mechanisms are defined to detect enhancement slow down. An exemplary stopping condition for the optimization objective c calculated upon the vector of KPIs in step 420 could comprise determining if the current optimal solution has not been enhanced of more than x % (e.g. 0.1% to 1%) and stopping the considered process if this condition is satisfied. This relative enhancement threshold "x %" may be replaced with an absolute one.

The skilled person will readily understand that the term "Neighbor" or "neighborhood" used in relation with the local search mechanisms of steps 416 and 420 are used herein to designate solutions (or values) that are "close" to a given solution (or given value) according to any suitable criteria. For example, the neighborhood of a given solution may be determined based on a distance criterion. For example, the neighbors of a given solution can be defined as comprising the solutions or values that are within a predefined distance. Distances may be metrics satisfying triangular inequality, for example Cartesian distance (square root of the sum of squares of slacks between elements of the two vectors), Manhattan distance (sum of the absolute values of the slacks between the two vectors, etc.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In particular the invention is not limited to the local search mechanisms used by the refining unit and the searching unit. Further the invention applies to any set of control parameters or KPI objectives. The invention is not limited to the applications described above in relation with certain embodiments of the invention; it can be applied to any application involving KPIs depending on control parameters where a MIP model capturing a significant part of the system is provided.

By coupling a MIP optimization component with a local search mechanism, the invention allows faster tuning of BPM models that obviates the need for manual iterations. The invention thereby achieves coupling of Operations Research techniques (local search, mixed integer programming) with discrete event simulation techniques, while such coupling is believed to be incompatible in the prior art. According to the various embodiments of the invention, the BPM model is "approximately" captured by the MIP model, and "precisely" captured by the simulation model.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

The invention claimed is:

1. A method of optimizing a Business Process Management (BPM) model, said model being associated with a plurality of key performance indicators (KPI) depending on a control parameter vector comprising a plurality of control parameters, the method comprising:
    separating, by a processor, said control parameters into a linear control parameter vector (X) and a non-linear control parameter vector (X'),
    iteratively calculating, by the processor, a set of candidate values for said control parameter vector, each candidate value being determined for a preselected value of a non-linear control parameter belonging to said non-linear control parameter vector (X') from execution of a mixed integer program (MIP) model associated with said BPM model, said plurality of key performance indicators (KPI) and said preselected value of the non-linear control parameter vector (X'), wherein calculating the set of candidate values for said control parameter vector comprises:
        (i) running said MIP model, which provides an approximation (X*) of an optimal value for said control parameter vector, an approximation for the Key performance indicators (c*), and an approximation (Y*) of a BPM outputs vector related to execution of the BPM model,
        (ii) running a simulation using the approximation (X*) of the optimal value for said control parameter vector which provides target values for the key performance indicators (c#) and target values for the BPM outputs vector (Y#),
        (iii) comparing the target values for the key performance indicators (c#) to the approximation for the key performance indicators (c*) and the target values for the BPM outputs vector (Y#) to the approximation (Y*) of the BPM outputs vector, and
        (iv) selecting said approximation (X*) of the optimal value for said control parameter vector as a candidate value for said control parameter vector in response to a precision of the approximation for the Key performance indicators (c*) and the approximation (Y*) of the BPM outputs vector with respect to the target values for the Key performance indicators (c#) and the target value for the BPM outputs vector (Y#) each satisfying a respective predefined criterion, and
    adjusting, by the processor, said BPM model based on at least one of said candidate values for said control parameter vector.

2. The method of claim 1, wherein selecting said approximation (X*) of the optimal value for said control parameter vector comprises determining if a precision indicator (PR) is inferior to a predefined threshold, said precision indicator being determined according to the following equation:
    $PR=|(c\#,Y\#)-(c*,Y*)|/|(c\#,Y\#)|$, where c* and Y* respectively represent the approximation of the Key performance indicators and the approximation of the BPM outputs vector, and c# and Y# respectively represent the target value of the Key performance indicators and the target value of the BPM outputs.

3. The method of claim 2, wherein calculating the candidate values for said control parameter vector further comprises:
    refining the approximation (X*) of the optimal value for said control parameter vector if the precision of the approximation for the Key performance indicators c* and the approximation Y* of the BPM outputs vector with respect to the target values for the Key performance indicators (c#) and the target value for the BPM outputs vector (Y#) is less than said predefined threshold using a local search mechanism, and
    repeating steps i to iv for a refined value obtained for the approximation (X*) of the optimal value for said control parameter vector.

4. The method of claim 3, wherein said local search mechanism comprises calculating a neighborhood of said approximation (X*) of the optimal value for said control parameter vector, and selecting a next value in said neighborhood as the refined value for the approximation (X*) of the optimal value for said control parameter vector.

5. The method of claim 3, wherein said refining the approximation (X*) of the optimal value for said control parameter vector is subject to non-satisfaction of at least one stopping condition.

6. The method of claim 1, wherein said preselected value of the non-linear control parameters belonging to the non-linear control parameter vector (X') is determined using a local search mechanism on the non-linear control parameter vector.

7. The method of claim 6, wherein said local search mechanism comprises calculating a neighborhood of a current value of the non-linear control parameter vector, and selecting a next value in said neighborhood as the preselected value of the non-linear control parameter vector (X').

8. A method for optimizing a BPM model, comprising:
    separating, by a processor, a plurality of control parameters for the BPM model into a group of linear control parameters and a group of non-linear control parameters;
    determining, by the processor, a value for each non-linear control parameter;
    determining, by the processor, an approximation of a set of optimal control parameters, an approximation of a set of key performance indicator (KPI) values and approximation of a set of BPM output values based at least on the value of each non-linear control parameter, the group of linear control parameters, the BPM model and a KPI vector;
    determining, by the processor, target KPI values and target BPM output values, wherein determining the target KPI values and the target BPM output values comprises running a simulation using the approximation of the optimal control parameters to generate the target KPI values and the target BPM output values; and refining, by the processor, the approximation of the optimal control parameters based at least on the target KPI values and target BPM output values.

9. The method of claim 8, further comprising:

generating a mixed integer programming (MIP) model based at least on the value of each non-linear control parameter, the group of linear control parameters, the BPM model and the KPI vector; and running the MIP programming model to provide the approximation of the optimal control parameters, the approximation of KPI values and the approximation of BPM output values.

10. The method of claim 9, further comprising:

comparing the target KPI values to the approximation KPI values and the target BPM output values to the approximation BPM output values to determine a precision of a MIP programming model, wherein the approximation of the optimal control parameters is refined in response to the precision of the MIP programming model being less than a predetermined threshold.

11. A system for optimizing a BPM model, comprising:

a processor;

a process model generation tool operating on the processor to generate a process model;

a BPM model optimization unit to optimize a BPM process by determining a set of optimal control parameters for a set of key performance indicators using a predetermined optimization process and a discrete-event simulation, wherein the BPM model optimization unit comprises:

a mixed integer programming (MIP) model and execution unit that generates a MIP model based on the candidate values for each non-linear parameter, the process model and the key performance indicators, wherein the MIP model is executed to generate an approximation of a set of optimal control parameters, an approximation of a set of key performance indicator parameters and an approximation of BPM output values;

a simulator that determines a set of target values for the KPI parameters and a set of target values for the BPM output values;

a comparator that compares an output of the MIP model and execution unit to an output of the simulator; and a refining unit that refines the approximation of the set of optimal control parameters in response to a precision of the output of the MIP model and execution unit with the output of the simulator not being satisfied; and an execution engine to execute the process model using the optimal control parameters from the BPM model optimization unit to satisfy the key performance indicators.

12. The system of claim 11, wherein the BPM model optimization unit comprises a control parameter separator that separates a plurality of control parameters into a linear parameter vector and a non-linear parameter vector.

13. The system of claim 12, further comprising a search unit that performs a local search of the non-linear parameters of the non-linear parameter vector and iteratively provides candidate values for each non-linear parameter.

14. The system of claim 11, further comprising a model format converter that filters the processing model to remove any unnecessary information from the processing model before providing the processing model to the MIP model execution and generation unit.

15. A computer program product for optimizing a Business Process Management (BPM) model, the computer program product comprising:

a non-transitory computer readable storage medium having computer readable program code embodied therewith, the computer readable program code comprising:

computer readable program code configured to separate a plurality of control parameters of a control parameter vector into a linear control parameter vector and a non-linear control parameter vector;

computer readable program code configured to iteratively calculate a set of candidate values for the control parameter vector, each candidate value being determined for a preselected value of a non-linear control parameter belonging to the non-linear control parameter vector from execution of a mixed integer program (MIP) model associated with the BPM model, a plurality of key performance indicators (KPI) and a preselected value of the non-linear control parameter vector, computer readable program code configured to run said MIP model, which provides an approximation ($X^*$) of an optimal value for said control parameter vector, an approximation for the Key performance indicators ($c^*$), and an approximation ($Y^*$) of a BPM outputs vector related to execution of the BPM model, computer readable program code configured to run a simulation using the approximation ($X^*$) of the optimal value for said control parameter vector which provides target values for the key performance indicators($c\#$) and target values for the BPM outputs vector ($Y\#$), computer readable program code configured to compare the target values for the key performance indicators ($c\#$) to the approximation for the key performance indicators ($c^*$) and the target values for the BPM outputs vector ($Y\#$) to the approximation ($Y^*$) of the BPM outputs vector, and computer readable program code configured to select said approximation ($X^*$) of the optimal value for said control parameter vector as a candidate value for said control parameter vector in response to a precision of the approximation for the Key performance indicators ($c^*$) and the approximation ($Y^*$) of the BPM outputs vector with respect to the target values for the Key performance indicators ($c\#$) and the target value for the BPM outputs vector ($Y\#$) each satisfying a respective predefined criterion, and computer readable program code configured to adjust the BPM model based on at least one of the candidate values for the control parameter vector.

* * * * *